United States Patent [19]

Takada et al.

[11] Patent Number: 5,079,409
[45] Date of Patent: Jan. 7, 1992

[54] HEATER CONTROL SYSTEM

[75] Inventors: Akirhiro Takada, Neyagawa; Kunihiro Onishi; Yoshihiro Nakajima, both of Osaka, all of Japan

[73] Assignee: Mita Industrial Co., Ltd., Osaka, Japan

[21] Appl. No.: 584,240

[22] Filed: Sep. 18, 1990

[30] Foreign Application Priority Data

Sep. 27, 1989 [JP] Japan .................................. 1-251241
Sep. 27, 1989 [JP] Japan .................................. 1-251242

[51] Int. Cl.⁵ .............................................. H05B 1/02
[52] U.S. Cl. ..................... 219/497; 219/492; 219/505; 219/216; 323/901; 323/235
[58] Field of Search ............... 219/494, 492, 497, 499, 219/501, 485, 505, 216; 323/235, 901; 307/117

[56] References Cited

U.S. PATENT DOCUMENTS

| | | | |
|---|---|---|---|
| 3,621,373 | 11/1971 | Mitchell | 323/901 |
| 3,959,714 | 5/1976 | Mihelich | 323/901 |
| 4,256,951 | 3/1981 | Payne et al. | 219/486 |
| 4,307,440 | 12/1981 | Inoue | 323/901 |
| 4,461,990 | 7/1984 | Bloomer | 323/901 |

Primary Examiner—Mark H. Paschall
Attorney, Agent, or Firm—Jordan and Hamburg

[57] ABSTRACT

A heater control system has a phase control circuit coupled between a power supply and a heater to control the phase of current to be supplied to the heater. A short circuit device is connected to short circuit the phase control circuit to allow current from the power supply to flow directly to the heater. A control circuit allows the phase control circuit to operate for a predetermined time after the power supply is turned on, and after the elapse of this predetermined time, shorts the phase control circuit with the short circuit device. In a modification, the phase control circuit may be normally inactive, and be energized to reduce current to the heater when the power supply is being drained by another device.

8 Claims, 4 Drawing Sheets (a) SOLENOID 10

(b) TRIAC 8 GATE SIGNAL (c) POWER SUPPLY TO HEATER 483

HEATER CONTROL SYSTEM

BACKGROUND OF THE INVENTION AND RELATED ART STATEMENT

The present invention relates to heater control systems for controlling the electric current or power to be supplied to a heater, and more particularly to such a heater control system for use in the fixing unit of an image forming apparatus.

Usually, the resistance value of heaters is small when the heater is at room temperature immediately after energization and increases as the temperature of the heater rises. For example, a 1200-watt heater has a resistance value of about 0.8 ohm when at room temperature, and the value increases to about 8.3 ohms when the heater temperature rises to the steady-state level. Accordingly, an excessive rush current flows through the heater immediately after energization. In the case of the 1200-watt heater, the rush current is about 120 A. The rush current is therefore likely to cause welding of the contact of the relay for controlling the heater temperature or a malfunction of the power supply.

To overcome this problem, Unexamined Japanese Patent Publication SHO 63-310587 discloses a system which is adapted to connect a resistor in series with a heater only when the heater temperature is low and to short-circuit the resistor when the heater temperature has risen to suppress the rush current immediately after the closing of the power supply and eliminate the influence of the ohmic loss.

However, if the resistor of the heater control system is set, for example, to 7.5 ohms to suppress the rush current to the current (about 12 A for the 1200-watt heater) at the time when the heater is heated, the ohmic loss is 1080 W. Accordingly, the resistor has a large size and evolves heat due to the resistance. Further because the rush current is suppressed only by the resistor, the current through the heater decreases as the resistance value of the heater increases with a rise in the heater temperature.

On the other hand, heaters for use in the fixing units of copying machines and like image forming apparatus are on-off controlled so as to be maintained in a predetermined temperature range (between the fixing temperature and a lower temperature limit) and to ensure an improved image quality and reduced power consumption (Unexamined Japanese Patent Publications SHO 55-108678 and SHO 55-79477).

More specifically, the heater control system of the publication SHO 55-108678 assures savings in power by on-off controlling the heater for temperature control while the apparatus is in a stand-by state for copying operation and contolling the heater output proportionally or nearly stepwise during the copying operation.

The heater control system of the publication SHO 55-79477 is adapted to apply the total voltage to the heater of the fixing roller until the fixing temperature is reached to raise the surface temperature of the fixing roller at an accelerated rate, to on-off control the heater for temperature control after the fixing temperature has been reached, and to turn off the heater when the exposure lamp is turned on so that the power to be used will not exceed the rated power.

Nevertheless, the heater control system of the publication SHO 55-108678 requires much time to raise the heater temperature to the fixing temperature since the power supply to the heater is suppressed to reduce the heater output for savings in power.

Although the control system of the publication SHO 55-79477 rapidly raises the heater temperature since the total voltage is applied to the heater until the fixing temperature is reached, the heater temperature drops while the exposure lamp is on since the heater is off during this period. Accordingly, it takes some time for the heater temperature to reach the fixing temperature after the exposure lamp is turned off. Further because the heater is off while the exposure lamp is on, the power used is well below the rated power, with the result that the overall apparatus uses power with a reduced efficiency.

SUMMARY OF THE INVENTION

An object of the present invention is to solve the foregoing problems and provide a heater control system which is adapted to control the current to be passed through a heater, raise the temperature of the heater rapidly, stabilize the heater temperature at the fixing temperature within a short period of time and enable the apparatus incorporating the system to use power with an improved efficiency.

The present invention provides a heater control system characterized in that the system comprises signal generating means for outputting a period signal corresponding to a transition period following the closing of a power supply, phase control means connected between the power supply and a heater for phase-controlling the current to be supplied to the heater only during the output period of the signal generating means, and shorting means for short-circuiting the phase control means after the output period to supply a current to the heater.

The heater control system thus constructed subjects the current to be supplied to the heater to phase control during the transition period in which the heater temperature is low after the closing of the power supply, whereas the current is supplied directly to the heater after the heater temperature has risen upon lapse of this period, whereby the rush current that would flow through the heater is suppressed to preclude the failure of the power supply due to an excessive current upon closing of the power supply. Further since no resistor is used for suppressing the rush current to the heater, undesired heat evolution is avoidable, while the heater temperature can be raised rapidly.

The phase control means is characterized in that the phase control means provides a delay time shortened successively with time.

With the heater control system thus constructed, the current to be supplied to the heater can be increased gradually, whereby the rise of the heater temperature can be further accelerated.

The phase control means is further characterized in that the phase control means effects definite phase control.

When the heater control system is thus constructed, the control program, etc. can be simplified.

The present invention further provides a control system characterized in that the system comprises temperature sensor means for detecting the temperature of a heater, phase control means connected between a power supply and the heater to supply a current to the heater with a delay period successively shortened with a rise in the temperature of the heater, and shorting means for short-circuiting the phase control means when the heater temperature is not lower than a set temperature to supply a current to the heater.

The heater control system having the above construction subjects the current to be supplied to the heater to phase control when the heater temperature is low, while the current is supplied directly to the heater when the heater temperature has risen to not lower than the set temperature. This makes it possible to suppress the current to be supplied to the heater when the heater has a low temperature and is low in resistance value and to gradually increase the current with a rise in the heater temperature.

For use in an image forming apparatus wherein an image transferred onto paper is fixed thereto by being heated with a heater, the present invention further provides a system for controlling the heater characterized in that the system comprises power sensor means for detecting the period during which the power used is in excess of predetermined power, and power control means for phase-controlling the power to be supplied to the heater only during the output period of the power sensor means so that the power used is not greater than the predetermined power.

While the power used by the image forming apparatus is in excess of the predetermined power due to the operation of the apparatus portion other than the heater, the heater control system subjects the power to be supplied to the heater to phase control during the period to reduce the power to be used to not greater than the predetermined power. When the apparatus portion other than the heater is brought out of operation, diminishing the power used to not greater than the predetermined power, the phase control of the power supply to the heater is changed over to usual control, with the result that the power predetermined for the image forming apparatus can be used more efficiently than heretofore possible. It also becomes possible to prevent supply of excessive power from the power supply and preclude degradation of images due to an output voltage reduction of the power supply Further because the power supply to the heater is continued during the operation of the apparatus portion other than the heater, the fixing roller can be heated to the fixing temperature within a shortened period of time.

The above and other objects, features and advantages of the present invention will become more apparent upon a reading of the following detailed description and drawings.

DESCRIPTION OF THE PREFERRED EMBODIMENTS

Figure 1:
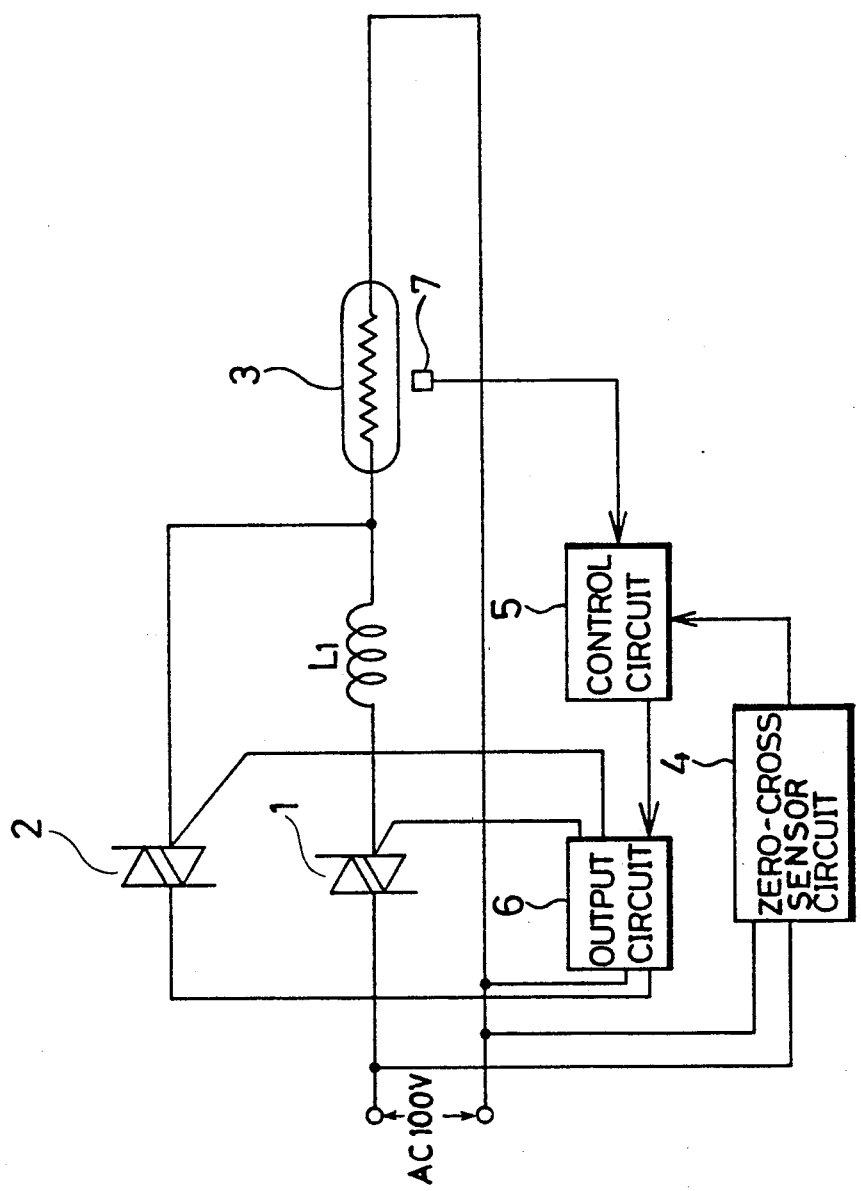
FIG. 1 is a block diagram showing a heater control system as a first embodiment of the invention.

FIG. 1 is a block diagram showing a heater control system as a first embodiment of the invention.

A triac 1 and a triac 2 are connected in parallel for supplying, for example, alternating current of 100 V to a heater 3 in accordance with gate control signals from an output circuit 6. More specifically, the triac 1 serves to phase-control the current to be supplied to the heater 3 during a transition period following the closing of the power supply to suppress the rush current to the heater 3. The triac 2 acts to on-off control the current supply to the heater 3 after the lapse of the transition period to stabilize the heater 3 to the steady-state (fixing) temperature. The triacs 1, 2 turn on when the gate receives, for example, a high signal, and turn off when the polarity of the current to the heater reverses (zero-crossing, see FIG. 2).

A choking coil L1 is connected in series with the triac 1 and acts to suppress the peak of the phase-controlled output current from the triac 1.

A zero-cross sensor circuit 4 serves to detect the time when the polarity of the current to be supplied to the heater 3 reverses (zero-crossing). A control circuit 5 serves to produce a control signal for the triac 1 to phase-control the current to be supplied to the heater 3. The control circuit 5 is internally provided with timer means for producing a control signal to turn off the triac 1 and turn on the triac 2 upon lapse of a predetermined period of time after the closing of the power supply. The control circuit 5 further produces a control signal for on-off controlling the triac 2 after the lapse of the predetermined period so that the temperature of the heater 3 as detected by a temperature sensor 7 will stabilize to the steady-state temperature.

The output circuit 6 delivers gate control signals in accordance with the respective control signals from the control circuit 5 to the gates of the triacs 1, 2.

When the control circuit 5 causes the triac 1 to phase-control the current to be supplied to the heater 3, the circuit 5 prepares a control pulse by delaying the detection signal from the zero-cross sensor circuit 4 by a predetermined period of time and feeds the control pulse to the output circuit 6 as a control signal. The output circuit 6 converts the control pulse to a trigger pulse and feeds the trigger pulse to the gate of the triac 1.

The operation of the heater control system of the above construction will be described with reference to the timing chart of FIG. 2. The current to the heater 3 is phase-controlled by the triac 1 in two steps.

Upon closing of the power supply, the control circuit 5 first feeds control pulses to the output circuit 6 for controlling the triac 1 and the triac 2. In response to the control pulses, the output circuit 6 feeds trigger pulses to the gate of the triac 1. Accordingly, the triac 1 phase-controls the current to be supplied to the heater 3 in response to the trigger pulses, with the triac 2 remaining off.

Figure 2:
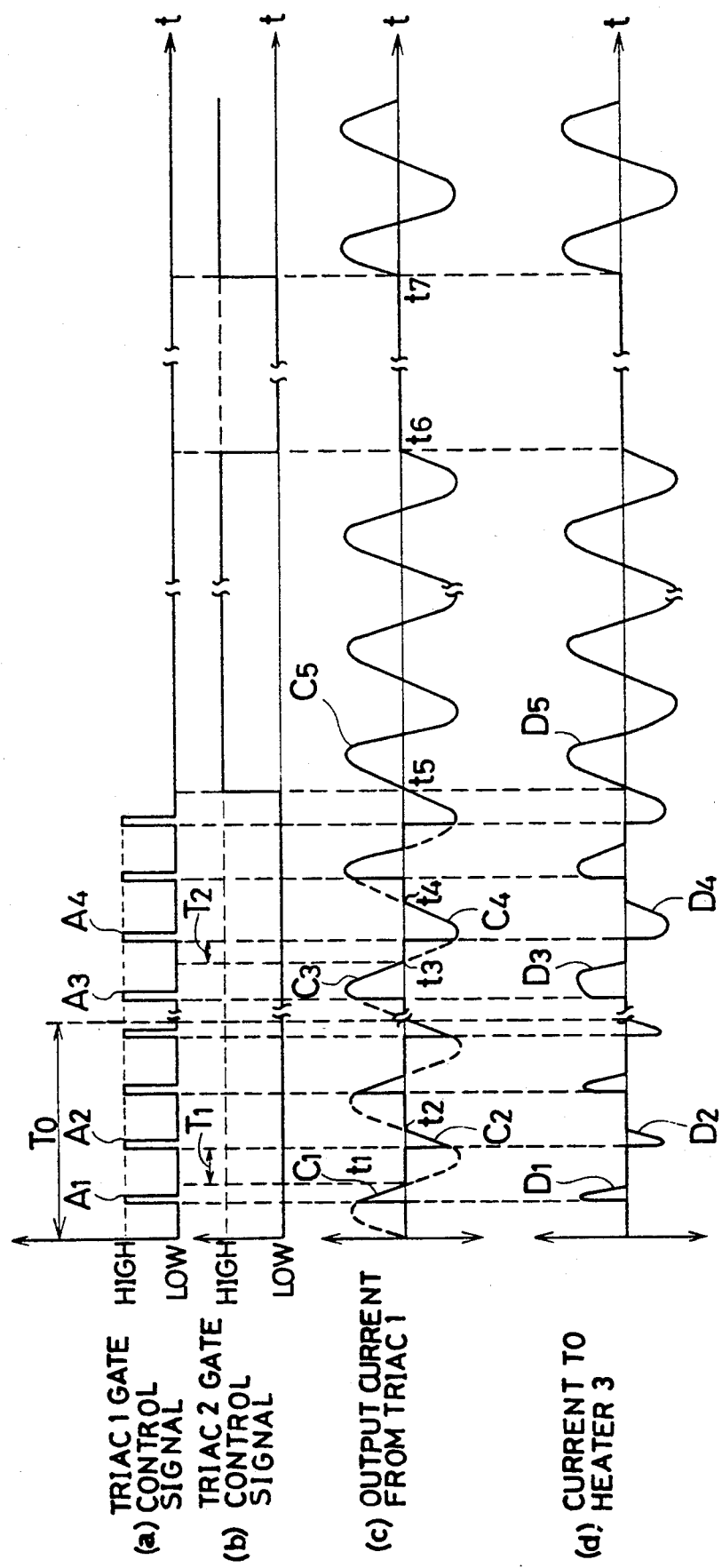
FIG. 2 is a timing chart showing the operation of the heater control system of FIG. 1.

More specifically, a control pulse delayed by the predetermined period from the zero-crossing time of the current to be supplied to the heater 3 is given to the output circuit 6 for the phase control, whereupon the circuit 6 feeds to the gate of the triac 1 a trigger pulse delayed by a period T1 from the zero-crossing time (see FIG. 2, waveform (c)) of the current as represented by the waveform A1 (A2) in FIG. 2, (a). The triac 1 turns on every time the trigger pulse is given and turns off at the zero-crossing time point t1 (t2).

Consequently, as represented by the waveforms C1, C2 in FIG. 2,(c), the triac 1 feeds to the choking coil L1 an output which is off for the period T1 every half wave of the current to the heater 3. As represented by the waveforms D1, D2 of FIG. 2, (d), the choking coil L1 suppresses the peaks of the current to be supplied to the heater 3. As a result, the rush current to the heater 3 is suppressed even when the resistance value of the heater 3 is small.

Further upon lapse of a predetermined period T0 from the closing of the power supply, the delay period of the control pulse is altered. As represented by the waveforms A3, A4 of FIG. 2, (a),, trigger pulses delayed by a period T2 shorter than the period T1 are delivered from the output circuit 6 to the triac 1 in order to increase the current in corresponding relation to some increase in the resistance value of the heater 3 due the increased temperature thereof resulting from the power supply during the period T0.

Consequently, as represented by the waveforms C3, C4 of FIG. 2, (c), the triac 1 delivers to the choking coil L1 an output which is off for the period T2 every half wave of the current to the heater 3. As represented by the waveforms D3, D4 of FIG. 2, (d), the choking coil L1 supplies current to the heater 3 at a rate greater than the rate represented by the waveforms D1, D2 of FIG. 2, (d), with the result that the amount of heat evolution by the heater 3 is larger than is the case with the period T0, raising the temperature of the heater 3 at a higher rate and thereby increasing the resistance value of the heater 3.

The triac 1 is turned off by a control signal from the control circuit 5 at time t5 at which the heater 3 has a greatly increased resistance value due to the rise of the temperature. The system is so adapted that the temperature of the heater 3 is still below the steady-state temperature at time t5, so that the triac 2 conducts at time t5. Thus, as represented by the waveform C5 of FIG. 2, (c), current is supplied through the triac 2 directly to the heater 3. This causes the heater 3 to generate a larger amount of heat than before time t5 to result in a more rapid rise in the temperature of the heater 3.

Upon the heater temperature rising to the steady-state temperature at time t6, the triac 2 turns off to block the current supply to the heater 3. When the temperature of the heater 3 drops to a level thereafter, the triac 2 conducts again at time t7. Thus, the triac 2 is on-off controlled to maintain the heater 3 within the steady-state temperature range.

In this way, immediately after the turn on of the power supply, the current to be supplied to the heater 3 is phase-controlled, permitting the choking coil L1 to suppress the peaks of current supply to the heater 3, whereby the rush current that would flow immediately after the turn on when the resistance value of the heater 3 is small can be suppressed effectively. Further upon the lapse of period T0 after the closing of the power supply, the delay of the control signal is shortened from period T1 to period T2 so as to increase the current supply to the heater 3 after the resistance value of the heater 3 has increased owing to some rise in the heater temperature. This accelerates the rise in the heater temperature.

Although the current to be supplied to the heater 3 is subjected to 2-step phase control according to the above description, the control may be effected in three steps. In this case, the delay period for trigger pulses is shortened in succession with time after turning on the power supply to gradually increase the current supply to the heater 3. Alternatively instead of the stepwise phase control of the current, the delay period may be made definite. This results in a slower rise in the temperature of the heater 3 but serves to simplify the program, etc. for the control circuit 5.

Next, another heater control system will be described as a second embodiment of the invention. Although the so-called transition period for phase control is determined according to the lapse of time from the closing of the power supply in the first embodiment, the period is determined according to the temperature of the heater 3 as detected by the temperature sensor 7 in the case of the second embodiment. The second embodiment has the same circuit construction as the first embodiment.

The control circuit 5 is adapted to successively shorten the delay period of control pulses with a rise in the temperature of the heater 3 as in FIG. 2 described. The output circuit 6 feeds trigger pulses to the gate of the triac 1 in response to control pulses. Accordingly, the triac 1 gradually increases the current supply to the heater 3 with the rise in the temperature of the heater 3, with the triac 2 held off.

Upon the rise of the heater temperature to a predetermined temperature, the triac 1 is turned off by a control signal from the control circuit 5, and the triac 2 is turned on. When the temperature of the heater 3 thereafter further rises to the steady-state temperature, the triac 2 is turned off to block the current to the heater 3. Upon the heater temperature thereafter drops to a certain level, the triac 2 conducts again. Thus, the triac 2 is on-off controlled so as to maintain the heater 3 within the steady-state temperature range.

A thyristor or like other switching device may be used in place of the triac.

The phase control means can be provided by a common gate and pulse generator means for producing gate pulses of specified width in synchronism with outputs of the zero-cross sensor circuit 4. In this case, full-wave or half-wave rectified direct current is also controllable.

Figure 5:
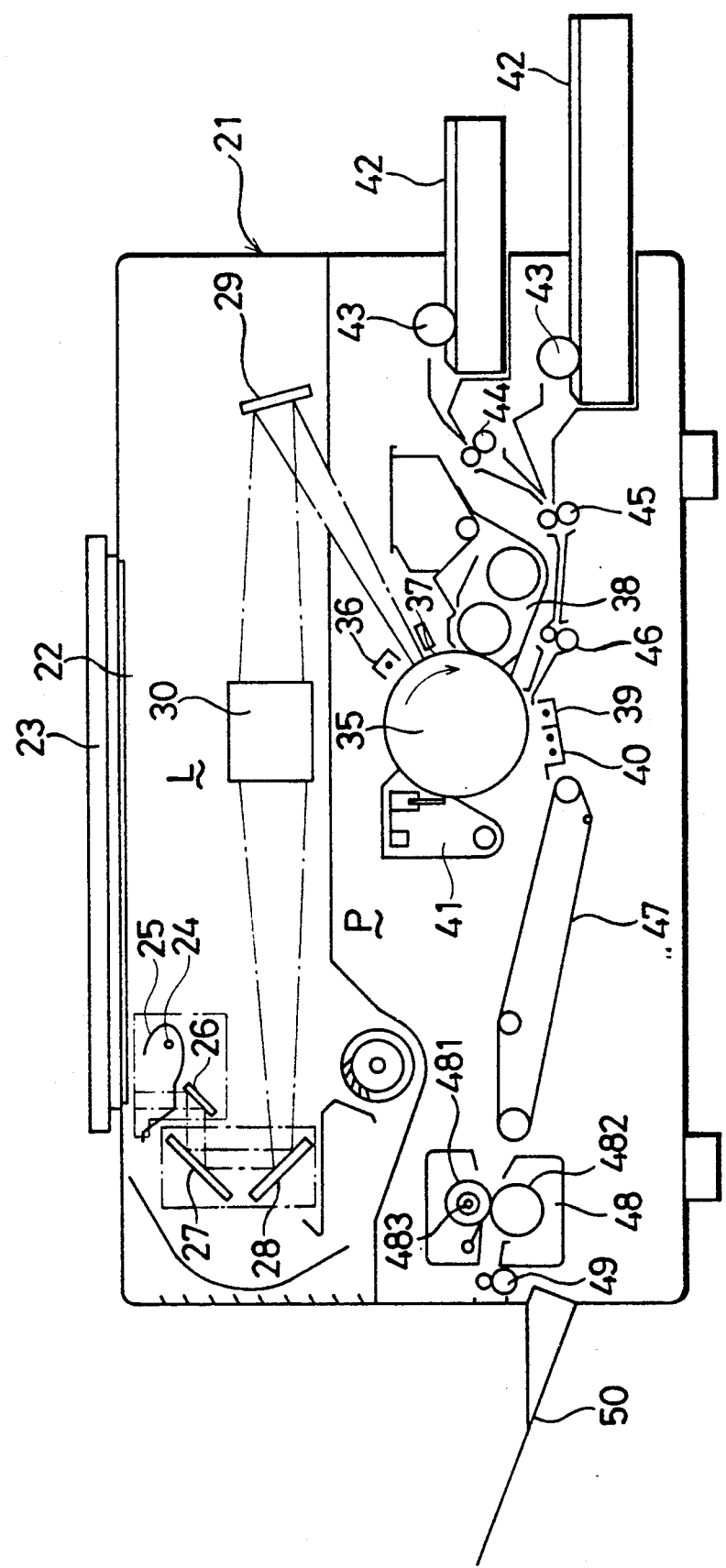
FIG. 5 is a diagram showing an image forming apparatus incorporating the heater control system of FIG. 3.

FIG. 5 is a diagram showing the construction of a copying machine (image forming apparatus) incorporating a heater control system as a third embodiment.

The copying machine 21 has at its top a contact glass plate 22 and a document holder 23 and is internally provided with an optical system L and image forming means P.

The optical system L comprises a light source composed of a fluorescent lamp 24 serving as an exposure lamp and a reflector 25, mirrors 26 to 29, and a lens assembly 30. The light from the light source is reflected from an original on the glass plate 22, guided to the lens assembly 30 via the first to third mirrors 26 to 28 and thereafter projected on a photosensitive member 35 via the mirror 29. The fluorescent lamp 24 is adapted to turn on not only during copying operation but also while the machine is in a stand-by state for copying.

The image forming means P comprises the photo-sensitive member 35, charger 36, blank lamp 37, developing unit 38, transfer charger 39, separating charger 40, cleaner 41, etc. for developing an electrostatic latent image on the photosensitive member 35 with a toner and transferring the toner image onto paper A paper feeder comprises, as arranged generally along the direction of feed of paper, paper cassettes 42, 42, feed rollers 43, 43, pairs of transport rollers 44, 45 and a pair of register rollers 46, whereby the paper is fed to the photosensitive member 35 for the transfer of the toner image thereto. A conveyor belt 47, fixing unit 48, discharge roller 49, paper tray 50, etc. are provided for fixing the transferred toner image to the paper and discharging the paper.

The fixing unit 48 comprises a fixing roller 481 and a pressure roller 482. The fixing roller 481 has a heater 483 for heating the fixing roller 481. The toner image transferred to the paper is fused, pressed and thereby fixed to the paper by the fixing roller 481 and the pressure roller 482. The larger the amount of heat generated by the heater 483, the greater is the power consumption. The fixing roller 481 is adapted to be maintained at a predetermined temperature even while the machine is in the stand-by state.

Figure 3:
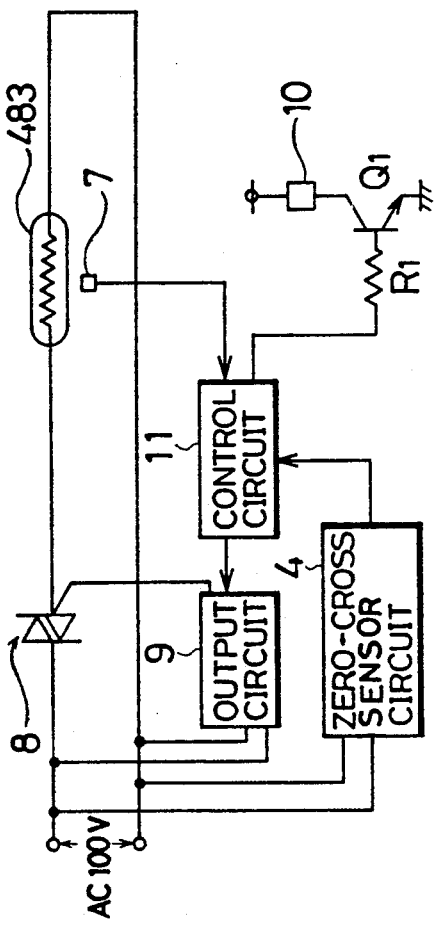
FIG. 3 is a block diagram showing a heater control system as a third embodiment of the invention.

Next, the third embodiment, i.e., the system for controlling the heater 483, will be described with reference to FIG. 3. Throughout FIGS. 1 and 3, like parts are designated by like reference numerals.

A triac 8 supplies alternating current, for example, of 100 V to the heater 483 from an unillustrated power supply in response to a gate voltage signal from an output circuit 9. The triac 8 turns on when receiving, for example, a high signal at its gate and turns off when the polarity of the alternating current reverses (zero-crosses, see FIG. 4). The power supply supplies power not only to the heater 483 but also to a solenoid 10 for operating the clutches of the feed rollers 43, 43, main motor, fan, heater for the photosensitive member, fluorescent lamp 24, etc.

The heater 483 is one having the greatest possible capacity, such that the capacity of the heater 483 will not exceed the power obtained by subtracting the power consumed by the fan, fluorescent lamp 24, etc. (exclusive of the solenoid 10) during copying operation from predetermined power for the overall image forming apparatus. For example, suppose the predetermined power for the apparatus is 1500 W, and the power supply to the components of the apparatus other than the heater 483 during copying operation is 300 W. The power capacity determined for the heater 483 is then 1200 W. The term the "predetermined power" refers to the rated power or permissible power for the image forming apparatus.

The output circuit 9 feeds the gate signal to the gate of the triac 8 in accordance with a control signal from a control circuit 11. The control circuit 11 controls the components of the copying machine 21 and produces a control signal in accordance with the temperature of the heater 483 as detected by a temperature sensor 7. The control signal causes the output circuit 9 to produce the gate signal for the control of the triac 8 so as to maintain the heater 483 within a predetermined fixing temperature range.

When driving the solenoid 10 via a resistor R1 and transistor Q1 during copying operation, the control circuit 11 produces a control signal to control the triac 8 for the phase control of the power to be supplied to the heater 483 during the driving so that the overall power supplied will not exceed the capacity of the power supply. For example, suppose the predetermined power is 1500 W, the power capacity of the heater 483 is 1200 W, and the power capacity of the solenoid 10 is 30 W. The power to be supplied to the heater 483 is then lowered to 1170 W by phase control while the solenoid 10 is driven.

For the phase control of the power to be supplied to the heater 483, the control circuit 11 feeds to the output circuit 9 a control signal, i.e. control pulse prepared by delaying the detection signal from a zero-cross sensor circuit 4. The output circuit 9 converts the control pulse to a trigger pulse and feeds the pulse to the gate of the triac 8.

Figure 4:
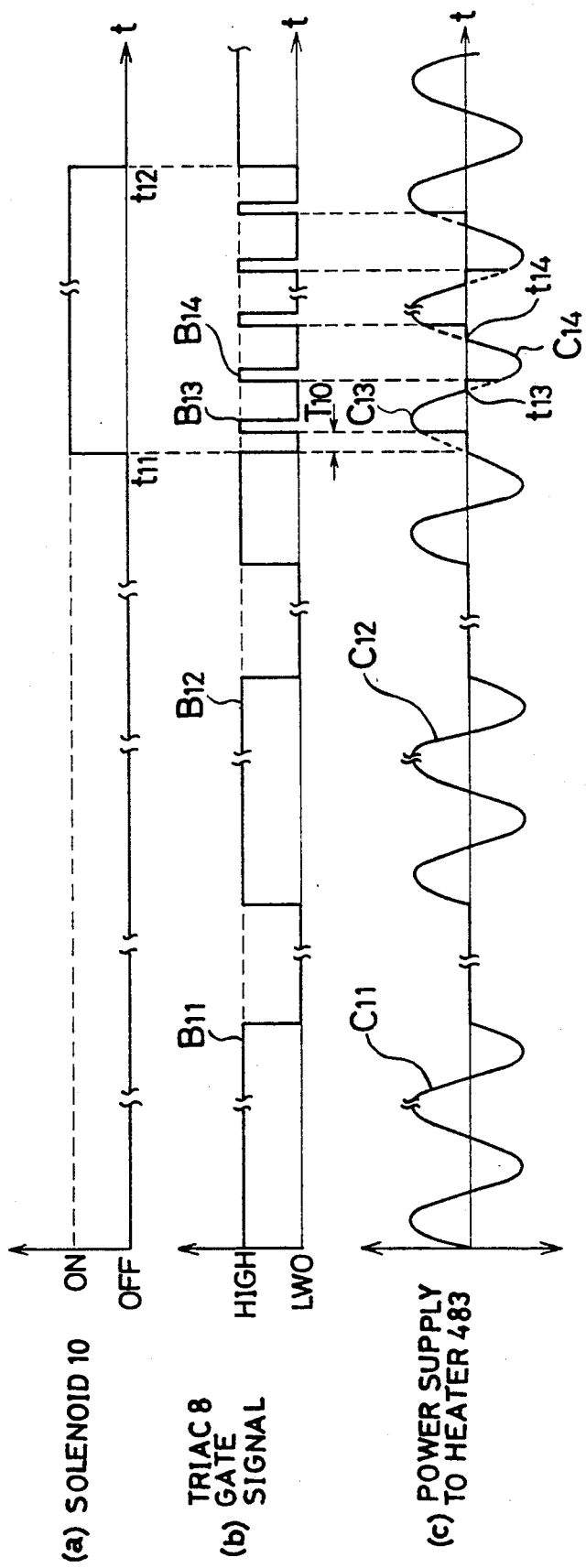
FIG. 4 is a timing chart showing the operation of the heater control system of FIG. 3.

The operation of the heater control system thus constructed will be described next with reference to the timing chart of FIG. 4. As already described, it is assumed that the predetermined power is 1500 W, that the power capacity of the heater 483 is 1200 W, and that the power capacity of the solenoid 10 is 30 W. The control pulse from the control circuit 11 is so delayed that the power to be supplied to the heater 483 is phase-controlled to 1170 W.

Before the power supply is turned on, the heater 483 of the fixing roller 481 is approximately at room temperature. When the power supply is turned on, the temperature of the heater 483 is detected by the temperature sensor 7, and the control circuit 11 feeds a high control signal to the output circuit 9, whereupon the output circuit 9 feeds the high signal B11 of FIG. 4, (b) to the gate of the triac 8 as a gate signal, turning on the triac 8. Power is therefore supplied to the heater 483 from the power supply while the triac 8 in on as represented by the waveforms C11, C12 of FIG. 4, (c).

At this time, the heater 483 generates heat at 1200 W, so that the temperature of the heater 483 reaches the specified fixing temperature within a short period of time. The fixing temperature reached is detected by the temperature sensor 7, whereupon the control circuit 11 applies a low signal to the output circuit 9, which in turn feeds a low gate signal to the triac 8 to turn off the triac 8. Consequently, the power supply to the heater 483 is discontinued, allowing the heater 483 to cool gradually. Upon the temperature of the heater 483 dropping to the lower limit fixing temperature (hereinafter referred to as the "lower limit temperature"), the control circuit 11 feeds a high signal to the output circuit 9 again, turning on the triac 8 for the supply of power to the heater 483. The temperature of the heater 483 rises to the specified fixing temperature again.

As a result, the heater 483 is on-off controlled so that the temperature of the heater is maintained within a predetermined fixing temperature range.

On the other hand, with the start of a copying operation, the solenoid 10 is turned on at time t11 for feeding paper. Simultaneously with the energization of the solenoid 10, the control circuit 11 feeds a control pulse to the output circuit 9, whereupon the circuit 9 feeds to the gate of the triac 8 a trigger pulse B13 a period T10 delayed from the zero-crossing time of the alternating current. Thus, every time the triac 8 receives the trigger pulse B13 (B14), the triac turns on, and turns off at the zero-crossing time t13 (t14) of the alternating current to supply power, held off for the period T10 every half wave of the current, to the heater 483 as represented by FIG. 4, (c), waveforms C13, C14.

As a result, the power supply to the heater 483 reduces to 1170 W, and the power used by the overall apparatus including the heater 483 and the solenoid 10 is limited to not greater than the predetermined power. When the solenoid 10 is turned off at time t12 upon completion of its operation, the phase control of the power supply to the heater 483 is changed over to the usual on-off control thereof for maintaining the heater 483 within the predetermined fixing temperature range. More specifically, upon the temperature of the heater 483 reaching the lower limit temperature, the control circuit 11 applies a high signal to the output circuit 9, turning on the triac 8 for the supply of power to the heater 483 to raise the temperature of the heater 483. Upon the heater 483 reaching the fixing temperature, the control circuit 11 delivers a low signal to the output circuit 9, turning off the triac 8 to discontinue the power supply to the heater 483.

Although the above description is given with reference to the case wherein the solenoid 10 operates, the system may be made to operate in the same manner as above in the case where the predetermined power is exceeded by the operation of another component of the apparatus or by the simultaneous operation of a plurality of components of the apparatus. Although the power supply to the heater 483 is reduced to 1170 W by phase control, the power supply may be reduced below 1170 W by phase control.

Although the present invention has been fully described by way of example with reference to the accompanying drawings, it is to be understood that various changes and modifications will be apparent to those skilled in the art. Therefore, unless otherwise such change and modifications depart from the scope of the invention, they sould be construed as being included therein.

What is claimed is:

1. A system for controlling a heater comprising:
   phase control means coupled between a power supply and the heater for controlling the phase of the current to the heater;
   shorting means connected to short circuit said phase control means to allow current from the power supply to flow directly to the heater; and
   control means comprising means for controlling said phase control means to operate for a predetermined time after current is initially output from the power supply, and means responsive to the elapse of the predetermined time for suspending operation of said phase control means to allow said shorting means to supply current to said heater.

2. The system of claim 1 further comprising suppressing means provided between said phase control means and the heater for suppressing peaks of the phase-controlled current to smooth current supplied to the heater.

3. The system of claim 2 wherein said phase control means is connected in series with said suppressing means, and said shorting means is connected in parallel with said phase control means and said suppressing means.

4. The system of claim 2 wherein said phase control means comprises means for providing a delay between the start of a voltage cycle of the power supply and the start of a current pulse for application to the heater, and means for successively shortening said delay with time.

5. The system of claim 2 wherein said phase control means comprises means for providing a fixed delay between the start of a voltage cycle of the power supply and the start of a current pulse for application to the heater.

6. A system for controlling a heater comprising:
   phase control means coupled between a power supply and the heater for controlling the phase of current to the heater;
   shorting means connected to short circuit said phase control means to allow current from the power supply to flow directly to the heater;
   sensor means for detecting the temperature of the heater; and
   control means responsive to said sensor means for allowing said phase control means to operate until the heater reaches a predetermined temperature, and for thereafter suspending operation of said phase control means and allowing said shorting means to operate after the heater reaches the predetermined temperature.

7. The system of claim 6 wherein said phase control means comprises means for providing a delay between the start of a voltage cycle of the power supply and the start of a current pulse for application to the heater, and means for successively shortening said delay with time.

8. An image forming apparatus comprising:
   fixing means for fixing an image transferred on paper, the fixing means having a heater;
   power supply means coupled to supply a current to the heater;
   sensor means for detecting a condition at which current to be supplied to the heater is in excess of a predetermined current;
   phase control means coupled between the power supply means and the heater for controlling the phase of current supplied to the heater; and
   control means responsive to said sensor means for controlling said phase control means to operate when said current is in excess of the predetermined current, whereby current supplied to the heater is maintained below the predetermined current.

* * * * *